March 3, 1970 J. BELART 3,498,419
MECHANICAL ACTUATING MEANS FOR INTERNAL-EXPANSION BRAKES
Filed Feb. 26, 1968 2 Sheets-Sheet 1

INVENTOR:
JUAN BELART
BY
Karl F. Ross
ATTORNEY

March 3, 1970  J. BELART  3,498,419
MECHANICAL ACTUATING MEANS FOR INTERNAL-EXPANSION BRAKES
Filed Feb. 26, 1968  2 Sheets-Sheet 2

INVENTOR:
JUAN BELART
BY
Karl F. Ross
ATTORNEY

United States Patent Office 3,498,419
Patented Mar. 3, 1970

3,498,419
MECHANICAL ACTUATING MEANS FOR
INTERNAL-EXPANSION BRAKES
Juan Belart, Walldorf, Hesse, Germany, assignor to Alfred
Teves G.m.b.H., Frankfurt am Main, Germany, a corporation of Germany
Filed Feb. 26, 1968, Ser. No. 708,016
Claims priority, application Germany, Feb. 28, 1967,
T 33,303
Int. Cl. F16d 51/22, 65/30
U.S. Cl. 188—78        9 Claims

ABSTRACT OF THE DISCLOSURE

A Bowden-cable actuating device for internal-expansion brakes which comprises a U-shaped lever having a fulcrum carried by a linearly shiftable U-shaped bracket attached to the sheath of the Bowden cable and bearing with one arm of the lever on a force-transmitting member acting upon the brakeshoes while a double-arm lever is fulcrumed on the U-shaped lever at a location on the other side of its pivot and is acted upon by the core wire of the Bowden cable.

My present invention relates to an actuating system for internal-expansion brakes and, more particularly, to a system of this nature controlled by a Bowden cable.

It is common practice in the automotive-vehicle field to provide internal-expansion brakes which have a brake drum attached to a vehicle wheel and a pair of cylindrical-segmental brakeshoes lying diametrically opposite one another in juxtaposition with the drum whose internal cylindrical surface is frictionally engaged by these shoes to effect brake operation. The shield upon which the brakeshoes are mounted is commonly attached to the nonrotatable axle housing or some other nonrotatable part of the vehicle. Such brakes generally comprise a double-acting wheel-brake cylinder bearing in opposite directions upon respective link members to urge corresponding extremities of the arcuate brakeshoes against the disk. Alternatively, individual wheel-brake cylinders may be provided for the purpose. Such brakes may also be formed with mechanical actuating means and, indeed, some brake constructions provide only mechanical actuating means for shifting the brakeshoes outwardly against the disk. Brakes of this nature are known variously as "internal expanding brakes" because their brakeshoes are urged outwardly and away from one another at corresponding ends against inner surfaces of the drum, or as "drum-type brakes" so designated because of the configuration of the rotatable braking face. The mechanical actuating means may serve as the sole source of brake operation or merely as an auxiliary brake, e.g., an emergency, parking on locking brake, actuable from a remote location, adjacent the driver's seat by a Bowden line or the like. In general, the mechanical actuating means have comprised a lever pivotally mounted upon the brake shield or support and swingable about a fulcrum parallel to the axis of rotation of the drum in a plane parallel to the brake shield, the Bowden cable extending into the brake chamber between the shield and the tire-carrying wheel and its drum generally tangentially. Even toggle-lever or scissor-type actuating arrangements have been proposed. In almost all cases, the sheath of the Bowden cable is anchored to the brake shield and proportionately large linear strokes of the core wire are required to accomplish brake actuation. The stroke thus corresponds to a lever throw which is relatively large and must be accommodated by designing the brake assembly to be more spacious than would be otherwise desirable.

It is the principal object of the present invention to provide an improved mechanical actuating device for a drum-type brake of the character described.

Another object of this invention is to provide an improved Bowden-line controlled system for operating the brakeshoes of an internal-expanding brake.

According to the present invention, these objects are obtained by providing an actuating device along the brake shield of a drum-type brake which extends into the latter in a direction perpendicular to the brake shield, i.e., through an opening provided therein, the mechanism comprising a first lever fulcrumed about an axis perpendicular to the axis of rotation of the drum and generally radial with respect to its axis and parallel to the brake shield at a location between the arms of this first lever which is constituted as a U-section housing between the shanks of which a second lever is accommodated. According to an important feature of the present invention, the sheath of the Bowden cable acts directly upon the spreading device by urging the fulcrum in one direction while the core wire of the Bowden cable is connected to the second lever which is substantially completely received within the housing formed by the first lever, the second lever is pivotally connected to the first lever at one of its arms remote from the location at which the first lever acts upon one of the brakeshoes and proceeds inwardly from its pivot into the region of the fulcrum of the first lever where the second lever is pivotally anchored to the core wire of the Bowden line.

Thus, the present invention provides a spreading device, one of whose members forms an enclosure for a double-arm spreading lever, one arm of which acts upon the other brakeshoe while its other arm is engaged by the core wire of the Bowden line. The outer lever, in turn, has a pair of shanks between which the double-arm lever is substantially completely housed or at least receives this "other arm" of the second lever.

According to a further feature of this invention, the sheath of the Bowden line is mounted upon an angle member whose tongues pass through this opening in the brake shield and define, at their extremities, the pivot forming the fulcrum of the housing lever which is emplaced between the arms of this U. At the bight of the U, the sheath of the Bowden cable is anchored. At its free extremities, the U-shaped bracket is formed with slots open in the direction of movement of the sheath for brake actuation, these slots accommodating a pin, rivet or bolt defining the fulcrum of the housing lever. This fulcrum may also form a stop for the spreading lever within the housing lever in its swinging movement upon release of the brake.

Advantageously, the housing lever is stamped from sheet metal as two metallic blanks which are welded together in coextensive relationship by electrical resistance welding at least at locations at which they approach one another. To affix the U-shaped bracket to this housing lever, the fulcrum bolt is passed through the arms of the U and thence through the plates constituting the housing lever.

The above and other objects, features and advantages of the present invention will become more readily apparent from the following description, reference being made to the accompanying drawing in which.

Figure 3:
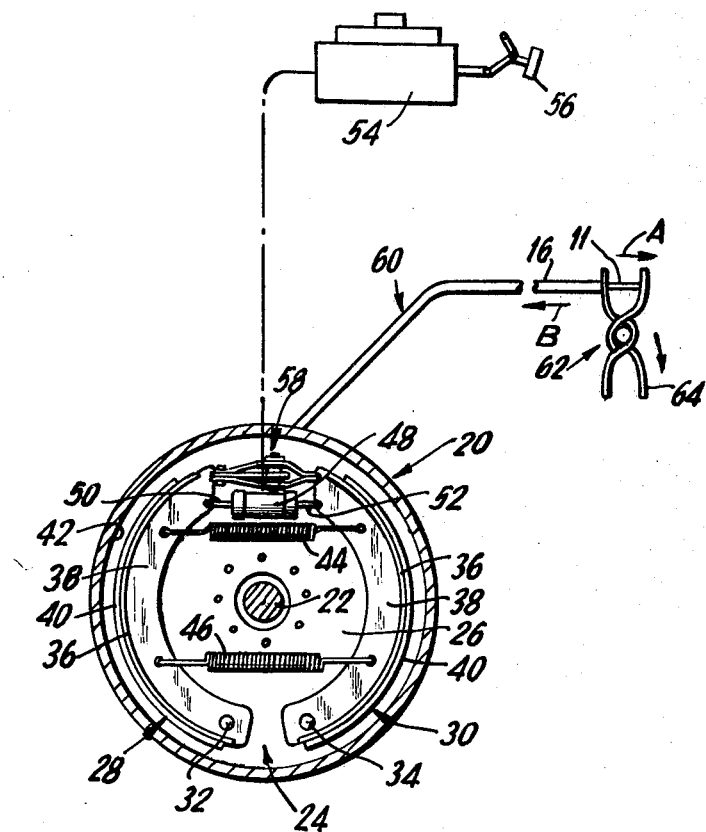
FIG. 3 is a diagrammatic elevational view with the drum partly broken away, of a vehicle brake embodying this invention.

Referring first to FIG. 3, it may be seen that a wheel brake of the type with which the present invention is concerned, generally comprises a brake drum 20 upon which the vehicle wheel is mounted (see Principles of Automotive Vehicles, U.S. Government Printing Office, Washington, D.C., 1956, pages 423 through 425 and 428 ff.), the brake drum is driven (in a manner not shown) by the axle 22 of the wheel or is merely rotatably supported thereby in the case of a nondriven steerable wheel. The brake chamber 24 is completed by the brake shield 26 whose brakeshoes 28 and 30 are pivotally mounted at 32 and 34 to the brake shield or to a self-energizing linkage as described in the aforementioned publication. The brakeshoes 28 and 30 comprise backing plates 36 of cylindrically segmental configuration with reinforcing webs 38 and brake linings 40 juxtaposed with the cylindrical internal braking face 42 of the drum. The brakeshoes 28 and 30 are drawn inwardly out of engagement with the surface 42 by a pair of tension springs 44, 46. To actuate the wheel brake hydraulically, a wheel-brake cylinder 48 is provided, the pistons of which act upon the brakeshoes via link members 50 and 52. As described in Principles of Automotive Vehicles, the brake cylinder is supplied with fluid from a master cylinder 54 controlled by the brake pedal 56.

Figure 1:
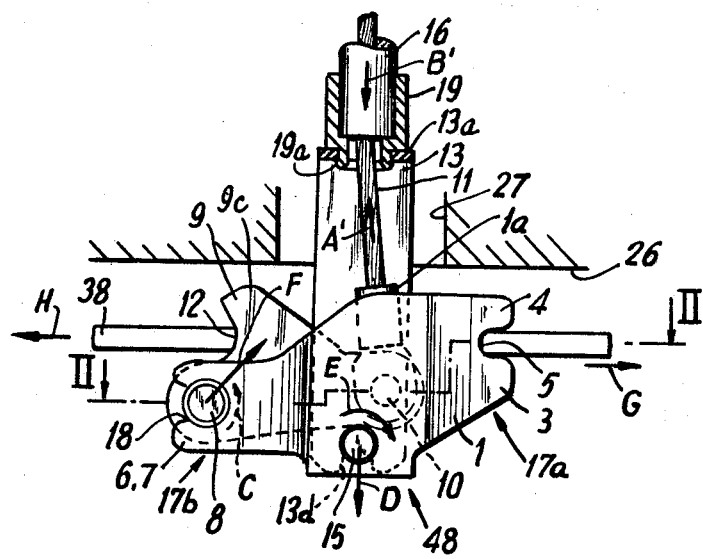
FIG. 1 is a plan view of a spreading device for an internal-expansion brake in accordance with the present invention, the brake shield and the cable-actuating means being represented diagrammatically.
Figure 2:
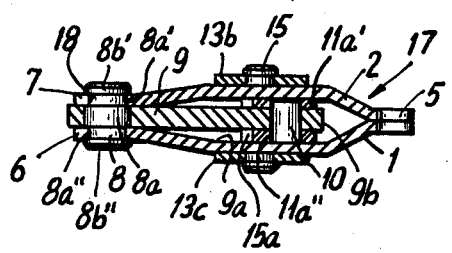
FIG. 2 is a cross-sectional view along the line II—II of FIG. 1.

In addition, an emergency, locking or parking brake is formed by the shoes 28 and 30 which may be spread outwardly by a mechanism 58 illustrated in detail in FIGS. 1 and 2 and whose bowden cable 60 is also represented diagramamtically here. The bowden cable may be actuated from a location in the region of the driver's seat of the vehicle by a lever arrangement 62. One lever 64 of this actuating mechanism may be swung in the clockwise sense to draw the core wire 11 of the bowden cable in the direction of arrow A while the reaction force is applied to the sheath 16 of the cable in the direction of arrow B when brake actuation is desired. Conventional detent means may be used to lock the emergency or parking brake in its engaged condition. However, it is also apparent that the spreading device 58 may be employed in the absence of the cylinder 48 when the internal-expanding brake is used to brake the front wheels nonhydraulically (see Principles of Automotive Vehicles, supra, page 434).

The mechanical spreading device illustrated in FIGS. 1 and 2 comprises a U-shaped housing 17 made up of a pair of mirror-symmetrical coextensive plates 1 and 2 which are resistance-welded together at their contacting faces 3, 4 at one end or arm 17a of this lever. The balance of the plates 1 and 2 forms legs which are cantilevered from the fixed locations 3 and 4 and terminate in extremities 6 and 7, form the other arm 17b of this lever. The legs are formed at these lever extremities with outwardly open slots 18 accommodating a pin 8 whose central boss 8a is of enlarged diameter and forms shoulders 8a' and 8a" against which the legs 6 and 7 are held by the heads 8b' and 8b" of this bolt. Members 1 and 2 thus define, between their welded portions 3, 4 and their rigidly connected ends 6 and 7, a central compartment 9a in which the spreading lever (second lever) 9 is swingably mounted upon the boss 8a as represented by the arrow C indicating the brake-actuating direction of movement of this lever. At one arm 9b of this lever, the core wire 11 of the bowden cable 60 is pivotally secured by a bifurcated lug 11a whose arms 11a' and 11a" embrace the lever 9, carry the pivot pin 10, and fit slidably between the members 1 and 2 of the housing lever 17. The other arm 9c of the spreading lever 9 has an arcuate recess 12 which acts upon the web 38 of one of the brakeshoes while the other of the brakeshoes has its web received within the notch 5 of housing lever 17.

The sheath 16 of the bowden cable is clamped in a ferrule 19 anchored at 19a in the bight 13a of a U-shaped bracket 13 extending with lateral clearance through an opening 27 in the brake shield 26. The legs 13b and 13c of this bracket are provided with outwardly open notches 13d accommodating a bolt or rivet 15 which transfixes the legs 13b, 13c and members 1 and 2. The central portion 15a of the spreading device acts at a stop in the limiting position of lever 9 in its inactive position as shown in FIG. 1.

When the control mechanism 62 is manually operated by squeezing the handle at the driver's seat of the vehicle, the motion of the bowden cable (arrow A and A' in FIG. 3 and A', B' in FIG. 1), shifts the fulcrum 15 in the direction of arrow D, while the lever 9 is swung as represented by arrow C in the counterclockwise sense. Concurrently, the toggle action rotates lever 17 in the clockwise sense (arrow E) and carries the pivot 8 in the direction of arrow F. The brakeshoes are urged outwardly against the drum (arrows G and H). It will be readily apparent that this system provides no resultant force upon the brake shield 26.

As can be seen from FIG. 1, tension applied to the core wire 11 of the bowden cable, in the direction of arrow A' concurrently with an opposite thrust of the sheath 16 of the bowden wire in the direction of arrow B' will apply this thrust to the pivot 15 in the direction of arrow D and tend to rotate the lever 9 in the counterclockwise sense about the pivot 8. Since the entire assembly is free to move relative to the brake shield, the pivot 10 moves upwardly (FIG. 1) while the pivot 15 moves downwardly, i.e. the pivots move apart, thereby tending to swing the arm 9c of the lever 9 to the left (arrow H) while tending to swing the lever 1 in the clockwise sense about the pivot 15. A force G is exerted by the arm 4 of the lever 1. Consequently, the brakeshoes are spread apart. The action is analogous to that of a toggle in which equal and opposite forces apply to articulated members thence to spread element connected with these members apart.

I claim:

1. In an internal-expanding vehicle wheel brake having a drum with an inner rotatable braking surface, a brake shield, and a pair of brakeshoes juxtaposed with said drum and mounted upon said shield for outward movement into engagement with said drum, the improvement which comprises a brakeshoe-spreading mechanism comprising a housing lever defining within itself a compartment and bearing upon one of said brakeshoes, a spreading lever swingably mounted in said compartment on said housing lever and bearing upon the other of said brakeshoes, said levers floating with respect to said brake shield, and means for swinging said spreading lever relative to said housing lever to urge said brakeshoes apart, said housing lever comprising a generally U-shaped member having a pair of spread-apart shanks defining said compartment between them, and pivot means swingably securing said spreading lever to said shanks at corresponding extremities thereof with an axis parallel to the brake shield, said means for swinging said spreading lever including a Bowden cable extending transversely to said brake shield and having a sheath element and a core element, one of said elements being pivotally connected to said housing lever, the other of said elements being connected pivotally to said spreading lever.

2. In an internal-expanding brake having a drum with an inner rotatable braking surface, a brake shield, and a pair of brakeshoes juxtaposed with said drum and mounted upon said shield for outward movement into engagement with said drum, the improvement which comprises: a brakeshoe-spreading mechanism comparising a housing lever defining within itself a compartment and bearing upon one of said brakeshoes; a spreading lever swingably mounted in said compartment on said housing lever and bearing upon the other of said brakeshoes; and means for swinging said spreading lever relative to said housing lever to urge said brakeshoes apart, said housing lever comprising a generally U-shaped member having a pair of spaced-apart shanks defining said compartment between them, and pivot means swingably securing said spreading lever to said shanks at corresponding extremities thereof, said housing lever and said shank being formed by a pair of mirror-symmetrical sheet-metal plates in coextensive relationship with one another, said plates being joined by resistance welding at a location remote from said pivot means.

3. The improvement defined in claim 2 wherein said pivot means includes a pin having a central boss between said shanks and forming shoulders spacing said shanks apart, said spreading lever being swingably mounted upon said central boss.

4. In an internal-expanding brake having a drum with an inner rotatable braking surface, a brake shield, and a pair of brakeshoes juxtaposed with said drum and mounted upon said shield for outward movement into engagement with said drum, the improvement which comprises: a brakeshoe-spreading mechanism comprising a housing lever defining within itself a compartment and bearing upon one of said brakeshoes; a spreading lever swingably mounted in said compartment on said housing lever and bearing upon the other of said brakeshoes; and means for swinging said spreading lever relative to said housing lever to urge said brakeshoes apart, said means for swinging said spreading lever comprising a U-shaped bracket having free extremities extending through said brake shield and defining a fulcrum for said housing lever.

5. The improvement defined in claim 4 wherein said fulcrum is a pin spanning said free extremities of said bracket and forming a stop for said spreading lever in the deactivated condition of said brake.

6. The improvement defined in claim 5 wherein said free extremities are formed with outwardly open notches receiving said pin.

7. The improvement defined in claim 4 wherein said last-mentioned means includes a Bowden cable having a sheath anchored to said bracket and a core wire connected with said spreading lever.

8. The improvement defined in claim 4 wherein said spreading lever is enclosed at least in major part by said housing lever.

9. The improvement defined in claim 4 wherein said housing lever is provided with a fulcrum and said spreading lever is secured to the last-mentioned means in the region of said fulcrum.

References Cited

UNITED STATES PATENTS

| 1,858,667 | 5/1932 | Goepfrich. |
| 2,422,187 | 6/1947 | Edgar. |
| 2,575,706 | 11/1951 | Farkas _____ 188—78 |

MILTON BUCHLER, Primary Examiner

THOMAS W. BUCKMAN, Assistant Examiner

U.S. Cl. X.R.

188—105